United States Patent [19]
Sponsler et al.

[11] Patent Number: 5,498,051
[45] Date of Patent: Mar. 12, 1996

[54] TUMBLE FORWARD SEAT

[75] Inventors: Karl G. Sponsler, Plymouth; Kurt A. Seibold, Dearborn Heights; Mark A. Pattok, Plymouth, all of Mich.

[73] Assignee: Hoover Universal, Inc., Plymouth, Mich.

[21] Appl. No.: 206,629

[22] Filed: Mar. 7, 1994

[51] Int. Cl.⁶ .................................................... B60N 2/10
[52] U.S. Cl. ..................... 296/65.1; 248/503.1; 297/326; 297/336
[58] Field of Search ................ 296/63, 65.1; 248/503.1; 297/331, 334, 335, 336, 344.1, 344.15, 326

[56] References Cited

U.S. PATENT DOCUMENTS

| | | | |
|---|---|---|---|
| 4,268,086 | 5/1981 | Okuyama | 297/63 |
| 4,484,776 | 11/1984 | Gokimoto et al. | 296/65 P |
| 4,700,989 | 10/1987 | Ercilla | 297/331 |
| 5,282,662 | 2/1994 | Bolsworth et al. | 296/65.1 |

*Primary Examiner*—David Mitchell
*Assistant Examiner*—Kia M. Robinson
*Attorney, Agent, or Firm*—Harness, Dickey & Pierce

[57] ABSTRACT

A tumble forward seat having mounting brackets that are rigidly attachable to a motor vehicle body and which establish a pivot axis for the seat frame. The brackets are releasably attached to a pair of front mounting pins in the vehicle body floor to hold the brackets stationary in the vehicle. The seat assembly frame then pivots about the mounting brackets from a generally horizontal use position to a tumble forward stowed position to increase the cargo capacity of the vehicle. When rotated forwarded to the up-tilted position, the rear legs of the seat rotate into the envelope formed by the seat frame to avoid leaving the rear legs projecting into the cargo space.

23 Claims, 4 Drawing Sheets

TUMBLE FORWARD SEAT

BACKGROUND AND SUMMARY OF THE INVENTION

The present invention relates to a tumble forward vehicle seat and in particular to tumble forward seat having a raised pivot point at the front of the seat about which the seat pivots as it is being tumbled forward.

Various embodiments of so-called "tumble forward" seats have been developed. Such seats are used as second or third row seats in a multi-purpose passenger vehicle or van and are formed so that they can be stored in a folded condition to make available a larger space in the vehicle for cargo. In a typical case, the seat frame is pivotally attached to the vehicle floor at the seat front end and is releasably attached to the vehicle floor at the rear end. To fold the seat, the seat back is first rotated forward to a horizontal position, resting upon the seat cushion. The seat frame is then released from the floor at the rear of the seat frame, allowing the frame to be rotated to an up-tilted position by raising the rear end of the frame upward and forward. Typically, the seats are also releasably mounted to the vehicle floor at the front end by latching the seat to a transversely extending mounting pin in the vehicle floor. The mounting pin serves as the pivot pin about which the frame rotates as the seat is tumbled forward.

It is desired that such seats include a biasing means for raising the seat without assistance once the seat is released at its rear end. In order for the seat to pivot about the front mounting pin, it is necessary to provide some form of linkage bearing against the vehicle floor to provide the force necessary to rotate the seat. Once folded, the seat must be held in the folded position throughout the operating motions of the vehicle. The required force to hold the seat in the folded position depends upon the extent of seat rotation to the folded position. The extent of rotation in turn depends upon the vehicle geometry, the seat design, the distance between the folding seat and the seat in front of it, etc. If the seat can be rotated far enough to raise the seat center of gravity over and forward of the pivot axis, less force is needed to retain the seat in the folded position than if the center of gravity is raised but remains behind the pivot axis. To increase the amount of seat rotation, it may be necessary to decrease the size of the seat cushion foam at the front of the seat cushion. This allows for more seat rotation before the cushion contacts the vehicle floor. The biasing force used to fold the seat and retain it in position must not be so great, however, as to prevent a vehicle operator from easily returning the seat from the folded positioned to the use position in opposition to the biasing force.

The seat assembly of the present invention overcomes the above disadvantages in prior art tumble forward seats by providing a front mounting bracket which is rigidly and releasably attached to the vehicle floor through a pair of longitudinally spaced mounting pins in the vehicle floor at the front of the seat. The seat frame is pivotally attached to the mounting bracket. When the seat is rotated to the folded, stowed position, the seat rotates about a pivot axis which is spaced above and separate from the mounting pins in the vehicle floor.

It is an advantage of the seat of the present invention that the seat pivot location can be optimized to provide a maximum rotation of the seat center of gravity and which minimizes the amount of foam cut away at the front of the seat cushion to achieve the desired seat rotation.

It is another advantage of the seat of the present invention that a relatively small opening can be provided in the vehicle floor for attaching the seat to the mounting pins since the seat does not rotate within the floor opening about one of the mounting pins.

It is a further advantage that since to the seat pivot is integral with the seat mechanism, the pivot can be lubricated and a longer life provided.

It is yet another advantage that with dual front mounting pins and a single rear mounting pin, it is impossible to install the seat in a rearward facing direction.

It is still a further advantage of the seat of the present invention that the front latch for installing the seat in a vehicle is non-releasable when the seat is in its use position.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
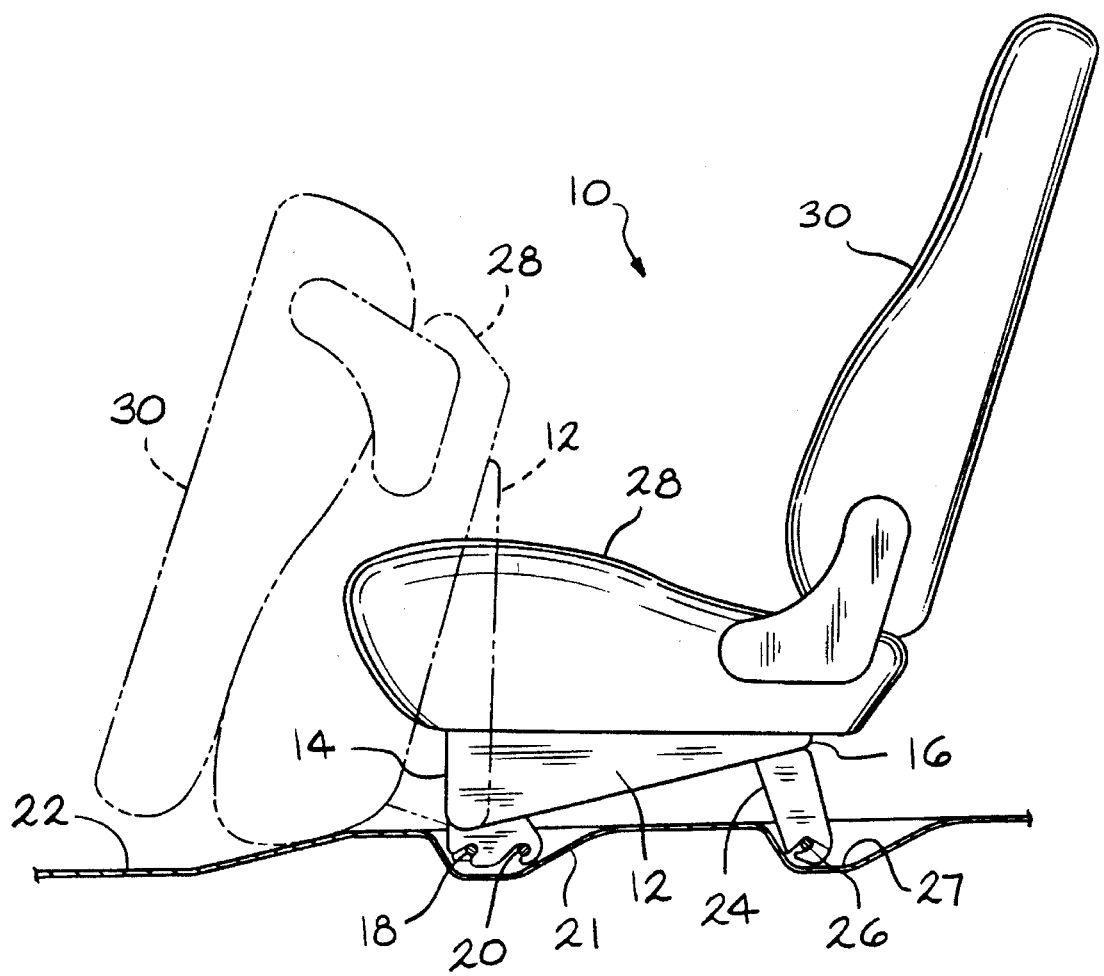
FIG. 1 is a side elevational view of the seat of the present invention installed in a vehicle and shown in both the use and folded positions.

The tumble forward seat of the present invention is shown in FIG. 1 and designated generally at 10. Seat 10 includes a frame 12 having a front end 14 and a rear end 16. At its front end 14, the seat is releasably attached to a pair of fore and aft spaced mounting pins 18 and 20 in recess 21 in the floor 22 of a vehicle body. At the rear end 16 of the frame, a pair of legs 24 and 25 extend downward and are releasably attached to a rear mounting pin 26 in recess 27 in the vehicle floor. The pins 18, 20 and 26 are shown as extending laterally across the entire seat. In practice, the pins 18, 20 and 26 are likely each formed by two laterally spaced short pins. As a result, there would be two longitudinally spaced pins at each front corner of the seat and one pin at each rear corner of the seat. Both the single long pin or dual short pin configurations are contemplated by the present invention.

Figure 3:
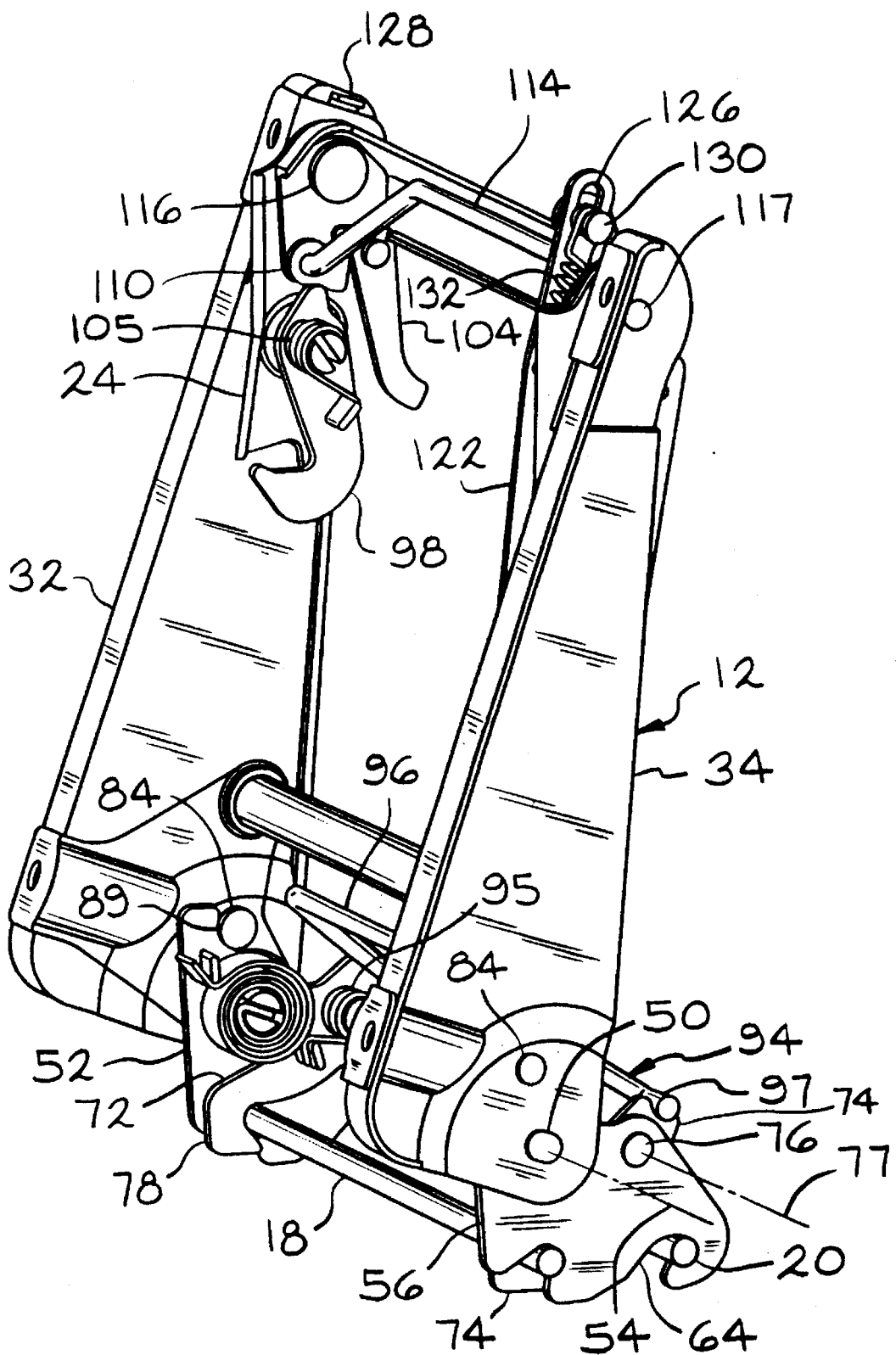
FIG. 3 is a perspective view of the seat frame shown in the folded position of the seat.
Figure 4:
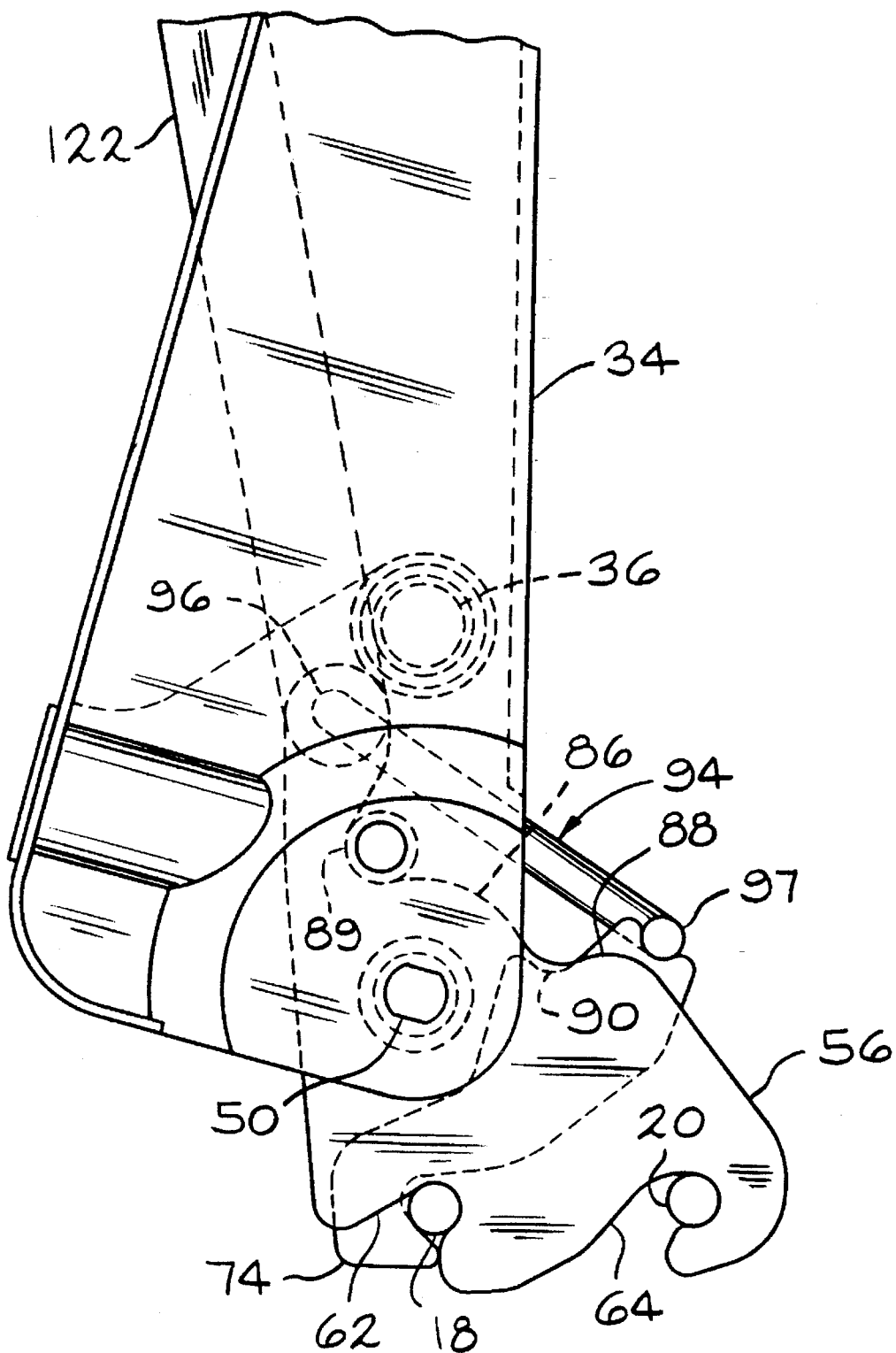
FIG. 4 is a side view of the front/lower portion of the seat frame with the seat in the folded position of FIG. 3.

A seat cushion 28 is mounted to the frame 12 and a seat back 30 is mounted to the seat cushion at the rear of the frame. A conventional recliner mechanism (not shown) is provided to enable the seat back to be rotated relative to the seat cushion. The seat includes a tumble forward mechanism which enables the seat to be rotated forward to an up-tilted, stowed position, shown in broken line in FIG. 1, to increase the cargo area in the vehicle. This is accomplished by first reclining the seat back 30 fully forward to a position resting upon the seat cushion 28, releasing the legs 24 and 25 from the mounting pin 26 and rotating the frame 12 by raising the rear end 16 of the frame above the front end 14. The tumble forward mechanism is described below in connection with FIGS. 2–4.

The frame 12 consists of a pair of fore and aft extending risers 32 and 34 coupled together by a transverse tube 36. The tube 36 is attached to the risers through reinforcements 38 and 40. Additional reinforcements 42 and 44 are provided on the risers 32 and 34 respectively at the rear end of the frame. The seat cushion 28 is attached to the frame 12 at the locations of the four reinforcements through the aperture 46 in each reinforcement.

Pivot pins 48 and 50 are fixed to the risers 32 and 34, respectively, adjacent the front end 14 of the frame and define a transverse pivot axis 54. A mounting bracket 52 in the form of a plate 53 is attached to the riser 32 by the pivot pin 48. Likewise, a mounting bracket 56 in the form of plate 55 is attached to the riser 34 by the pivot pin 50. The frame 12 rotates relative to the brackets 52 and 56 about the axis 54. The pins 48 and 50 include inwardly projecting studs 58 with diametrical through slots 60 for mounting the inner end of spiral clock springs 61. The outer ends of the clock springs 6.1 are attached to the mounting brackets 52 and 56 so as to rotationally bias the brackets relative to the frame 12.

Figure 2:
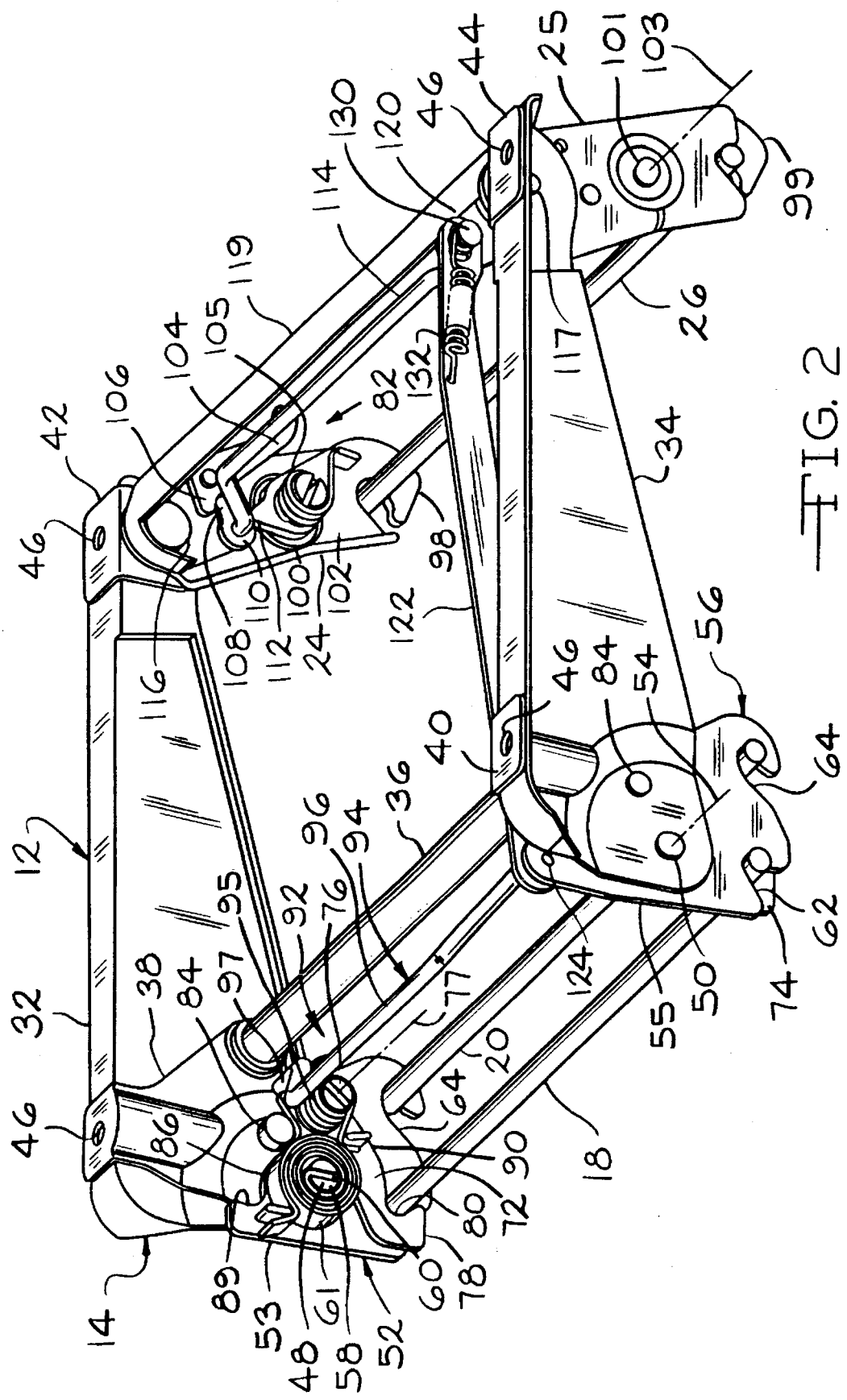
FIG. 2 is a perspective view of the seat frame shown in the use position of the seat.

The bottom edges of the mounting brackets 52 and 56 are each shaped to form front and rear slots 62 and 64. The slots have open ends, enabling the mounting brackets to be positioned around the mounting pins 18 and 20 in the vehicle floor and to surround these mounting pins on the top, rear and bottom sides of the pins. Front latch hooks 72 and 74 are rotatably carried on the brackets by pivot pins 76, only one of which is shown in FIG. 2, for rotation about an axis 77 parallel to axis 54. The latch hooks 72 and 74 have distal ends 78 which form hooks 80 that surround the front side of the mounting pin 18 whereby the mounting pin 18 is fully entrapped by the mounting brackets and latch hooks.

The dual mounting pins 18 and 20 in the vehicle body floor 22 enable the brackets to be held stationary relative to the vehicle body and to establish the pivot axis 54 about which the frame 12 rotates. In addition, the brackets form the front support for the frame 12. The effect of the springs 61 is a biasing of the frame 12 to the up-tilted position shown in FIG. 3. A rear latch mechanism 82 on the rear legs 24 and 25 operates to hold the frame 12 in the generally horizontal use position of the seat shown in FIG. 2.

The rear latch mechanism 82 includes a pair of latch hooks 98 and 99 attached to the legs 24 and 25 respectively. The rear latch hooks are rotatably carried by pivot pins 100 and 101 mounted to the rear legs. The pivot pins 100 and 101 each include spring mounting studs 102 which mount springs 105 (only one of which is shown in FIG. 2) for biasing the latch hooks 98 and 99 into latch positions beneath the mounting pin 26 in a conventional manner for removable vehicle seats. The bottom edges of the legs include notches into which the pin 26 is seated and is trapped by the hooks 98 and 99.

The rear latch mechanism is released by release lever 104 pivotally carried by the leg 24. Lever 104 has a lobe 106 engageable with a lobe 108 of cam 110. The cam, when rotated by the latch release lever engages a lobe 112 of the latch hook 98, causing the latch hook to rotate in a counterclockwise direction about the pivot pin axis 103. The purpose of the cam 110 is to provide the proper direction of rotation to the latch hook 98. A tie rod 114 couples the cam 110 on leg 24 with an identical cam on the leg 25 engageable with latch hook 99. Both latch hooks 98 and 99 are thus operated together to release the rear of the seat from the vehicle floor to enable rotation of the seat to its stowed position.

The rotational travel of the frame 12 about the axis 54 is limited by stop pins 84 mounted to the risers. The stop pins ride along recessed edges 86 in the mounting brackets 52 and 56. When the pins 84 contact ends 89 of the recessed edges, rotation of the frame 12 is stopped. In the raised position of the seat, the springs 61 hold the frame in place with the stop pins pushed against the ends 89 of the recessed edges.

The seat 10 is releasably latched to the front mounting pins 18 and 20. A release bar 94 extends transversely across the seat and is fixed at its ends 97 to the latch hooks 72 and 74. The center portion 96 of the bar is offset forwardly and upwardly from the ends 97 of the bar. Upward and rearward pulling of the center portion 96 of the bar 94 causes the bar and the latch hooks 72 and 74 to rotate together about the axis 77 of the pivot pins 76. This rotation of the latch hooks, clockwise as viewed in FIG. 4, moves the hooks from the open ends of slots 62 in the mounting brackets and from the front side of the mounting pin 18. This enables the mounting brackets 52 and 56 to be moved rearward, away from the pins 18 and 20, and the seat 10 to be removed from the motor vehicle. However, the seat can only be released at the front end after the rear legs have been released and the seat rotated from its use position. In the down or use position of the frame 12, the stop pins 84 are disposed within detents 90 in the latch hooks 72 and 74. This prevents the front latch hooks from being rotated to a release position when the seat is in the use position and attached to the rear mounting pin 26 by the rear latch mechanism 82. The latch hooks 72 and 74 are biased into latch positions by springs 95 (only one of which is shown) on the pivot pins 76.

The rear legs 24 and 25 are rotatably mounted to the risers 32 and 34 through pivot pins 116 and 117. The legs are also connected to one another by a bracket 119 extending transversely of the seat frame so that both legs rotate together. Leg 25 has an upwardly extending tab 120 which is connected to a link 122. Link 122 extends fore and aft of the seat frame, parallel to the riser 34, and is connected to the mounting bracket 56 by pivot pin 124 at a location spaced above the axis 54 forming a four bar linkage. Due to the spacing between the pivot pin 124 and the axis 54, as the frame is rotated from the use position to the up-tilted position of FIG. 3, the link 122 causes the legs 24 and 25 to rotate about pivot pins 116 and 117 respectively to a stowed position generally within the frame between the two risers 32 and 34. This increases the available cargo space behind the up-tilted seat assembly by eliminating what would be rearward projecting legs 24 and 25 if the legs did not rotate.

The link 122, at the connection with tab 120, includes a slot 126 to provide a limited degree of lost motion so that as the frame 12 is rotated from its up-tilted position to the use position, the legs 24 and 25 rotate out until they contact a stop 128 (FIG. 3) on the reinforcement 42. Continued rotation of the frame results in travel of the pin 130 through the slot 126. The stop 128 and the slot 126 reduce the effect of the variability in the relative positions of the floor mounting pins 18, 20 and 26 on the position of the rear legs 24 and 25.

A tension spring 132, connected to the pin 130 and the link 122, holds the pin against one end of the slot 126 when the seat is tumbled forward. After the rear legs contact the stop 128, as the frame continues to rotate to its use position, the link continues to travel, pulling on the spring as the pin travels through the slot.

The tumble forward mechanism of the seat of the present invention, by providing mounting brackets 52 and 56 which are rigidly and releasably attached to the vehicle body, establishes a pivot point for the frame 12 separate from the seat front mounting pin. This produces certain benefits not found in the prior art. For example, the seat pivot location can be optimized to provide a maximum tumble forward rotation of the seat center of gravity without requiring a cut away of the front portion of the seat cushion foam. Furthermore, because the mounting brackets do not rotate with the seat, only a relatively small opening is required for insertion of the mounting brackets into the recesses in the floor of the vehicle. No separate contact between the seat and the vehicle floor is necessary to provide the lifting force for the seat. Other benefits of the seat construction will be appreciated by those skilled in the art.

The seat of the present invention is shown for attachment to transversely extending mounting pins in the vehicle body. Such mounting pins are widely used for installing movable seats in a vehicle. The invention as broadly claimed below is not limited to a seat installed in a vehicle with these types of pins. Other mounting structures may be used.

It is to be understood that the invention is not limited to the exact construction illustrated and described above, but that various changes and modifications may be made without departing from the spirit and scope of the invention as defined in the following claims.

We claim:

1. A seat for a vehicle, the vehicle having a body with a fore and aft longitudinal direction and a side to side lateral direction and the vehicle body including first and second elongated front mounting pins, the front mounting pins extending in the lateral direction and being longitudinally spaced from one another and a third elongated rear mounting pin, the rear mounting pin also extending in the lateral direction and being spaced longitudinally rearward from the front mounting pins, said seat comprising:

a seat frame having front and rear ends;

a support frame pivotally coupled to said seat frame adjacent said front end for rotation of said seat frame relative to said support frame about a transverse axis extending in the lateral direction;

mounting means for rigidly, nonrotatably and releasably attaching said support frame to the first and second mounting pins in the vehicle body to fix the position of said transverse axis relative to the vehicle body and to prevent rotation of said support frame relative to the vehicle-body whereby said seat frame can be rotated relative to said support frame and the vehicle body about said transverse axis; and rear latch means at said rear end of said seat frame for releasably attaching said seat frame to said third mounting pin to hold said seat frame stationary relative to the vehicle body about said transverse axis.

2. The seat of claim 1 wherein:

said support frame includes a pair of laterally spaced mounting brackets each having lower edges; and said mounting means includes a pair of slots formed in said lower edges of said brackets, said slots having open ends for reception of the first and second front mounting pins of the vehicle body into said slots and said mounting means further includes a pair of latch members with one of said latch members being mounted to each of said brackets and being movable to latch positions closing the open ends of one of said slots in each of said brackets to entrap one of the front mounting pins within said one slot to prevent removal of said brackets from the front mounting pins whereby said support frame is mounted to the vehicle body.

3. The seat of claim 2 wherein:

each of said brackets are made of upright plates oriented fore and aft relative to said seat frame.

4. The seat of claim 1 wherein said rear latch means includes rear legs attached to said seat frame at said rear end and latch means for releasable coupling said rear legs to the third mounting pin in the vehicle body whereby said seat frame is prevented from rotating about said transverse axis.

5. The seat of claim 4 further comprising:

means for mounting said rear legs to said seat frame for rotation of said rear legs between use positions extending away from said seat frame and stowed positions within said seat frame; and four bar linkage means connecting said rear legs to said support frame for rotating said rear legs between said use and stowed positions as said seat frame is rotated about said transverse axis.

6. The seat of claim 5 further comprising:

stop means engageable with said legs for stopping the rotation of said legs when said legs reach said use position; and a slotted coupling between said linkage means and said rear legs to enable continued rotation of said seat frame about said transverse axis when said rear legs are in engagement with said stop means.

7. The vehicle seat of claim 1 further comprising:

means carried by said seat frame and engageable with said mounting means for preventing release of said mounting means when said seat frame is attached to the vehicle body by said rear latch means.

8. A seat for a vehicle having a body, said seat comprising:

a seat frame having front and rear ends and having a use position within the vehicle body in which said seat frame extends fore and aft between said front and rear ends;

a support frame pivotally coupled to said seat frame adjacent said front end for rotation of said seat frame relative to said support frame about a transverse axis;

mounting means for rigidly, nonrotatably and releasably attaching said support frame to the vehicle body to fix the position of said transverse axis relative to the vehicle body and to prevent rotation of said support frame relative to the vehicle body whereby said seat frame can be rotated relative to said support frame and the vehicle body from said use position to an uptilted stowed position in which said rear end of said seat frame is raised above said front end of said seat frame;

rear latch means adjacent said rear end of said seat frame for releasably attaching said seat frame to the vehicle body at a location spaced rearward from said transverse axis to hold said seat frame in said use position, said rear latch means being selectively releasable to permit rotation of said seat frame to said uptilted stowed position; and a seat cushion and seat back carried by said seat frame for rotation about said transverse axis together with said seat frame.

9. The vehicle seat of claim 8 wherein said mounting means attaches said support frame to a pair of transversely extending, fore and aft spaced, mounting pins in the vehicle body.

10. The vehicle seat of claim 9 wherein said mounting means comprises:

a pair of slots formed in said support frame and each having an open end for receiving the fore and aft mounting pins therein; and a movable latch member carried by said support frame and being movable to a latch position to close the open end of one of said slots to entrap one of the mounting pins within said one slot to prevent removal of said support frame from the mounting pins in the vehicle body.

11. The vehicle seat of claim 10 further comprising release means for moving said latch member from said latch position to a release position away from said one slot to enable the mounting pins to be removed from said slots and said seat to be removed from the vehicle body.

12. The vehicle seat of claim 11 further comprising a stop member protruding from said seat frame for engagement with said latch member when said seat frame is in said use position to prevent movement of said latch member from said latch position.

13. The vehicle seat of claim 8 further comprising:

means for preventing release of said mounting means when said seat frame is attached to the vehicle body by said rear latch means.

14. The vehicle seat of claim 8 wherein:

said rear latch means includes rear leg means attached to said seat frame at said rear end forming at least one rear leg extending from said seat frame; and a movable latch member carried by said rear leg means for releasable coupling said rear leg means to the vehicle body whereby said seat frame is prevented from rotating about said transverse axis.

15. The vehicle seat of claim 14 wherein:

said rear leg means is rotatably attached to said seat frame at said rear end for rotation of said rear left means relative to said seat frame between a use position and a stowed position; and further comprising four bar linkage means connecting said rear leg means to said support frame at a location spaced from said transverse axis for rotating said rear leg means to and from said use and stowed positions as said seat frame is rotated to and from said seat frame use and uptilted stowed positions respectively.

16. The vehicle seat of claim 15 further comprising:

stop means engageable with said rear leg means for stopping the rotation of said rear leg means when said rear leg means reaches said use position during rotation of said seat frame to said seat frame use position; and a slotted coupling between said linkage means and said rear leg means to enable continued rotation of said seat frame about said transverse axis when said rear leg means engages said stop means.

17. The vehicle seat of claim 8 further comprising spiral spring means coupled to said seat frame and said support frame for urging rotation of said seat frame about said transverse axis to said uptilted stowed position.

18. A seat for a vehicle having a body with fore and aft spaced front and rear seat supporting structures, said seat comprising:

a seat frame having front and rear ends and having a use position within the vehicle body in which said seat frame extends fore and aft between said front and rear ends;

a pair of laterally spaced support plates pivotally coupled to said seat frame adjacent said front end for rotation of said seat frame relative to said plates about a transverse axis;

mounting means for rigidly, nonrotatably and releasably attaching said support plates to the vehicle front seat supporting structure to fix the position of said transverse axis relative to the vehicle body and to prevent rotation of said support plates relative to the vehicle body so that said seat frame can be rotated about said transverse axis relative to said support plates and vehicle body from said use position to an uptilted stowed position by raising the rear end of the seat frame above said front end of said seat frame;

means forming at least one rear leg attached to said seat frame at said rear end and extending downward from said seat frame when said seat frame is in said use position for supporting said seat frame at said rear end;

rear latch means carried by said at least one rear leg for releasably attaching said at least one rear leg to the vehicle body rear seat supporting structure whereby said seat frame is prevented from rotating about said transverse axis; and a seat cushion and seat back carried by said seat frame for rotation about said transverse axis together with said seat frame.

19. The vehicle seat of claim 18 wherein said mounting means includes a pair of movable latch members with one latch member being carried by each of said support plates and being movable between latch positions engaging the vehicle body front seat supporting structure and release positions disengaged from the vehicle body front seat supporting structure.

20. The vehicle seat of claim 19 further comprising means protruding from said seat frame for engaging said movable latch members when said seat frame is in said use position to prevent movement of said latch members from said latch positions.

21. The vehicle seat of claim 19 further comprising a transversely extending latch release bar coupled to said moveable latch members for simultaneous movement of said latch members from said latch positions to said release positions.

22. The vehicle seat of claim 18 wherein:

said at least one rear leg is rotatably attached to said seat frame at said rear end for rotation relative to said seat frame between a leg use position and a leg stowed position; and further comprising four bar linkage means connecting said at least one rear leg to one of said support plates at a location spaced from said transverse axis for rotating said at least one rear leg to and from said leg use and stowed positions as said seat frame is rotated to and from said seat frame use and uptilted stowed positions respectively.

23. The vehicle seat of claim 22 further comprising:

stop means engageable with said at least one rear leg for stopping the rotation of said at least one rear leg when said at least one rear leg reaches said leg use position during rotation of said seat frame to said seat frame use position; and a slotted coupling between said linkage means and said at least one rear leg to enable continued rotation of said seat frame about said transverse axis when said at least one rear leg engages said stop means.

* * * * *